(12) United States Patent
Kim et al.

(10) Patent No.: US 10,175,841 B2
(45) Date of Patent: Jan. 8, 2019

(54) COLOR FILTER ARRAY HAVING TOUCH SENSOR AND DISPLAY PANEL HAVING THE SAME

(71) Applicant: LG Display Co., Ltd., Seoul (KR)

(72) Inventors: Min-Joo Kim, Seoul (KR); Tae-Hwan Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/606,919

(22) Filed: May 26, 2017

(65) Prior Publication Data

US 2017/0344153 A1 Nov. 30, 2017

(30) Foreign Application Priority Data

May 30, 2016 (KR) .................... 10-2016-0066672

(51) Int. Cl.
 *G06F 3/044* (2006.01)
 *G06F 3/033* (2013.01)
 (Continued)

(52) U.S. Cl.
 CPC .......... *G06F 3/044* (2013.01); *G02F 1/13338* (2013.01); *G06F 3/033* (2013.01);
 (Continued)

(58) Field of Classification Search
 CPC .. G02F 1/1333; G02F 1/13338; G02F 1/1335; G02F 1/133514; G02F 1/134309; G02F 1/1362; G02F 1/133512; G02F 1/1345; G02F 1/13452; G02F 1/13454; G02F 1/1368; G02F 1/133345; G02F 1/1343; G02F 1/134336; G02F 1/13439; G02F 1/136209; G02F 1/13458; G02F 1/136227; G02F 1/136286; G02F 2001/133519; G06F 2203/04103;
 (Continued)

(56) References Cited

U.S. PATENT DOCUMENTS

| | | | |
|---|---|---|---|
| 9,658,708 B2 * | 5/2017 | Misaki | G06F 3/0412 |
| 2013/0113734 A1 * | 5/2013 | Cho | G06F 3/044 345/173 |
| 2017/0212625 A1 * | 7/2017 | Lee | G02F 1/133345 |

FOREIGN PATENT DOCUMENTS

| | | |
|---|---|---|
| CN | 104020912 | 9/2014 |
| KR | 20120042438 | 5/2012 |

OTHER PUBLICATIONS

Office Action for Korean Patent Application No. KR 2016-0066672, dated Sep. 13, 2017, 7 Pages, (With Concise Explanation of Relevance).

* cited by examiner

*Primary Examiner* — Thoi Duong
(74) *Attorney, Agent, or Firm* — Fenwick & West LLP

(57) ABSTRACT

Disclosed are a color filter array having a touch sensor and a display panel having the same. The color filter array may comprise: a plurality of color filters arranged in first and second directions on a substrate; a touch block electrode disposed on the color filters to sense a user touch position; a black matrix disposed on the touch block electrode between the color filters; and a touch-sensing line which is disposed in any one of the first and second directions and at least one of which is connected to the touch block electrode. Thereby, when the color filter array is applied to a bending-type or folding-type display device, generation of cracks in the touch sensing line is reduced or minimized.

25 Claims, 7 Drawing Sheets

(51) Int. Cl.
　　*G06F 3/041*　　　(2006.01)
　　*G09G 3/20*　　　(2006.01)
　　*G09G 3/3291*　　(2016.01)
　　*H04N 5/357*　　　(2011.01)
　　*G02F 1/1333*　　(2006.01)

(52) U.S. Cl.
　　CPC .......... *G06F 3/0412* (2013.01); *G06F 3/0416* (2013.01); *G09G 3/2011* (2013.01); *G09G 3/3291* (2013.01); *H04N 5/357* (2013.01); *G09G 2300/0809* (2013.01); *G09G 2320/0276* (2013.01); *G09G 2360/148* (2013.01)

(58) Field of Classification Search
　　CPC .. G06F 2203/04111; G06F 2203/04112; G06F 2203/04104; G06F 2203/04107; G06F 3/0416; G06F 3/041; G06F 3/03547; G09G 3/3648; G09G 2300/0426; H01L 27/323; H01L 27/322; H01L 27/3244; H01L 51/5284; H01L 51/5203; H01L 51/5253
　　USPC .... 345/173, 87, 92; 349/106, 110, 138, 139, 349/149, 12, 151, 152
　　See application file for complete search history.

COLOR FILTER ARRAY HAVING TOUCH SENSOR AND DISPLAY PANEL HAVING THE SAME

CROSS-REFERENCE TO RELATED APPLICATION

This application claims priority under 35 U.S.C. § 119(a) of Republic of Korea Patent Application No. 10-2016-0066672, filed on May 30, 2016, which is hereby incorporated by reference in its entirety.

BACKGROUND

Technical Field

The present disclosure relates to a color filter array having a touch sensor and a display panel having the same, and more particularly, to a color filter array having a touch sensor capable of minimizing or reducing the generation of cracks and a display panel having the same.

Discussion of the Related Art

A touchscreen is an input device that allows a user to input a command by selecting indicated content displayed on, for example, a display device with the human hand or an object. That is, the touchscreen converts a contact position at which the human hand or the object comes into contact with the touchscreen into an electrical signal, and receives the indicated content selected at the contact position as an input signal. Because the touchscreen may substitute for a separate input device, such as a keyboard and a mouse, that is operated in the state of being connected to the display device, the range of applications thereof is gradually increasing.

Such a touchscreen is generally attached to the front surface of a display panel, such as a liquid crystal display panel or an organic field emission display panel. In this case, because the touchscreen is separately prefabricated and is attached to the front surface of the display panel, the overall thickness of the display panel is increased, and the increased thickness may deteriorate the visibility of an image.

In order to solve this problem, in-cell touch technology, in which a touch sensor is mounted in a pixel array of a display panel, has been proposed. In the in-cell touch technology, the touch sensor may be installed in the display panel without increasing the thickness of the display panel. However, the conventional in-cell touch technology adopts a first touch-sensing line, formed in a first direction, and a second touch-sensing line, formed in a second direction. As such, when the user touches a predetermined position, the capacitance between the first and second touch-sensing lines is changed at the touched position, and the touch position of the user is sensed by sensing the position at which the capacitance is changed.

However, because the conventional display panel having the touch sensor includes the first and second touch-sensing lines, when it is applied to a bending-type or folding-type display device, cracks may be generated in the first and second touch-sensing lines in the bending or folding area.

SUMMARY

Accordingly, the present disclosure relates to a color filter array having a touch sensor and a display panel having the same that substantially obviate one or more problems due to limitations and disadvantages of the related art.

An object of embodiments of the present invention is to provide a color filter array having a touch sensor capable of reducing or minimizing the generation of cracks and a display panel having the same.

Additional advantages, objects, and features of embodiments of the invention will be set forth in part in the description which follows and in part will become apparent to those having ordinary skill in the art upon examination of the following or may be learned from practice of the invention. The objectives and other advantages of embodiments of the invention may be realized and attained by the structure particularly pointed out in the written description and claims hereof as well as the appended drawings.

To achieve these objects and other advantages and in accordance with embodiments of the invention, as embodied and broadly described herein, there is provided a color filter array having a touch sensor, in which a plurality of color filters are arranged in first and second directions, and a touch-sensing line is disposed in any one of the first and second directions. As such, when the color filter array is applied to a bending-type or folding-type display device, the generation of cracks in the touch-sensing line is reduced or minimized.

In one aspect of the present invention, a color filter array having a touch sensor is provided. The color filter array comprises a plurality of color filters arranged in first and second directions on a substrate; a touch block electrode disposed on the color filters to sense a user touch position; a black matrix disposed on the touch block electrode between at least two of the color filters; and a touch-sensing line which is disposed in any one of the first and second directions and at least one of which is connected to the touch block electrode.

In another aspect of the present invention, a display panel is provided. The display panel comprises a thin-film transistor array and a color filter array bonded to the thin-film transistor array. The color filter array includes a touch sensor, a plurality of color filters arranged in first and second directions on a substrate; a touch block electrode disposed on the color filters to sense a user touch position; a black matrix disposed on the touch block electrode between at least two of the color filters; and a touch-sensing line which is disposed in any one of the first and second directions and at least one of which is connected to the touch block electrode.

It is to be understood that both the foregoing general description and the following detailed description of embodiments of the present invention are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this application, illustrate embodiment(s) of the invention and together with the description serve to explain the embodiments of the invention. In the drawings.

DETAILED DESCRIPTION

Hereinafter, embodiments of the present invention will be described in detail with reference to the accompanying drawings.

Figure 1:
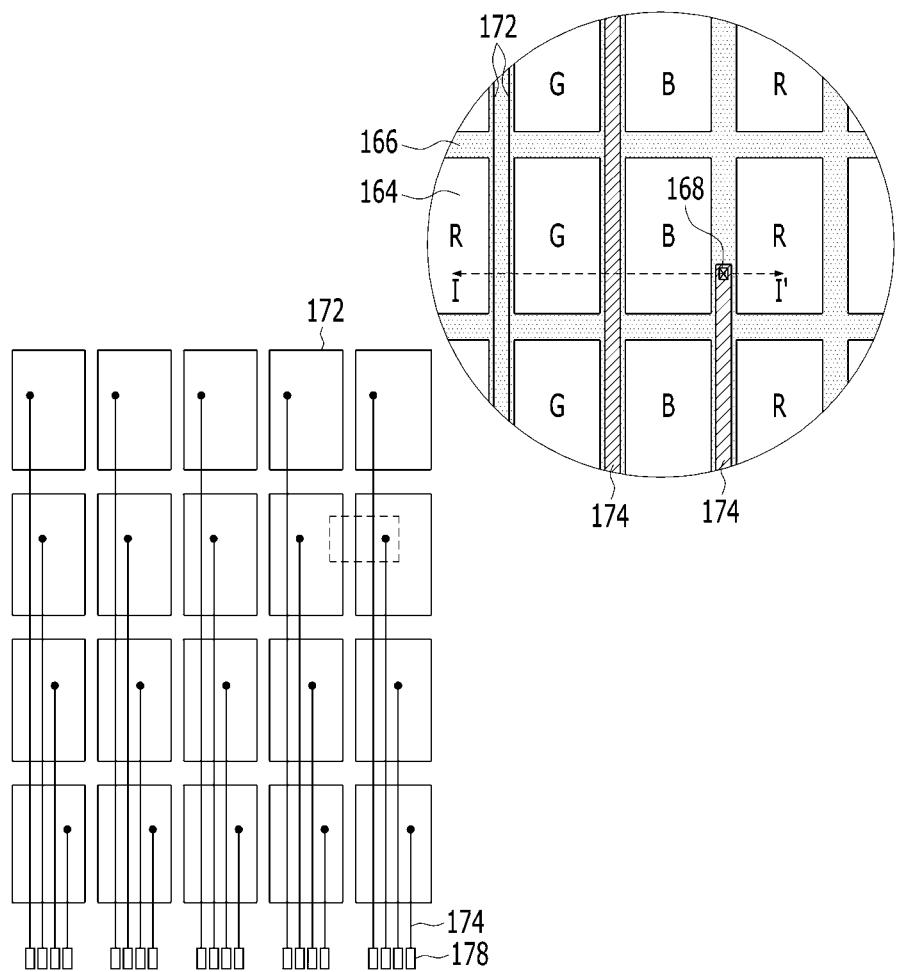
FIG. 1 is a plan view illustrating a color filter array having a touch sensor according to an embodiment.
Figure 2:
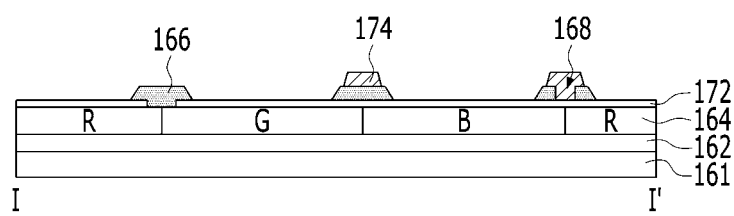
FIG. 2 is a cross-sectional view illustrating the color filter array having the touch sensor taken along line I-I' shown in FIG. 1, according to an embodiment.

FIGS. 1 and 2 are, respectively, a plan view and a cross-sectional view illustrating a color filter array having a touch sensor according to an embodiment.

The color filter array having the touch sensor illustrated in FIGS. 1 and 2 includes a buffer layer 162, a color filter 164, a touch block electrode 172, a black matrix 166, and a touch sensing electrode (touch-sensing line) 174, which may be sequentially formed on an upper substrate 161, in some embodiments.

The upper substrate 161 serves to support constituent elements disposed thereon. The upper substrate 161 is formed of a material having transparency so that light that has passes through the color filter 164 is emitted outward (e.g., out of the touch block electrode 172), and is also formed of a flexible material so as to be used in a bending-type or folding-type display device. For example, the upper substrate 161 is formed of a glass material or a transparent plastic material, such as polyimide.

The buffer layer 162 is disposed on the upper substrate 161 and serves to prevent diffusion of a foreign substance generated in the upper substrate 161. The buffer layer 162 is formed of at least one material selected from among $SiO_2$, $SiN_x$, and $AlO_x$.

The color filter 164 is arranged in first and second directions in a matrix arrangement on the buffer layer 162 in a corresponding sub-pixel area to realize the color of the corresponding sub-pixel area. A red (R) color filter 164 is formed on the buffer layer 162 in a red sub-pixel area, a green (G) color filter 164 is formed on the buffer layer 162 in a green sub-pixel area, and a blue (B) color filter 164 is formed on the buffer layer 162 in a blue sub-pixel area.

The black matrix 166 is formed on the touch block electrode 172 so as to overlap the area between the neighboring color filters 164 (e.g., the red and green color filters as shown on the left side in FIG. 2). The black matrix 166 serves to separate the respective sub-pixel areas from each other and to prevent light interference and leakage between the neighboring sub-pixel areas. The black matrix 166 is formed of a black insulating material, in order to insulate the touch block electrode 172 and the touch-sensing line 174 from each other in the non-contact area of the touch block electrode 172 and the touch-sensing line 174.

The touch block electrode 172 is used as a touch sensor that senses a user touch position during a touch sensing period, which may be a non-display period during which no image is displayed by a corresponding display device. To this end, a plurality of touch block electrodes 172 is spaced apart from each other by a predetermined distance on the upper substrate 161. Each of the touch block electrodes 172 has a size corresponding to a given number of sub-pixel areas, which is equal to or greater than M (here, M is an integer number of 2 or more), in consideration of a user touch area. For example, one touch block electrode 172, which corresponds to 8 sub-pixels in a first direction and 8 sub-pixels in a second direction, forms one touch sensor. The touch block electrode 172 is exposed through a touch contact hole 168, which penetrates the black matrix 166.

In some embodiments, the touch-sensing line 174 is formed in a straight line in any one of the first and second directions along the black matrix 166 so as to overlap the black matrix 166. In particular, the touch-sensing line 174 is formed in the area that does not undergo bending or folding when applied to a bending-type or folding-type display device. Thereby, the touch-sensing line 174 may reduce or minimize the generation of cracks therein when applied to a bending-type or folding-type display device, thereby increasing product design freedom and reliability, compared to a touch-sensing line of the related art that is formed in a bent line form having first and second directions. In addition, embodiments of the present invention in which the touch sensing line 174 is formed in any one direction may minimize a bezel area and may achieve a simplified structure, a reduced number of mask processes, increased productivity, and reduced costs, compared to the related art, in which two touch-sensing lines are formed in two directions.

The touch-sensing line 174 has a line width that may be equal to or less than that of the black matrix 166 in areas in which the touch-sensing line 174 is not connected to the touch block electrode 172 (e.g., a "disconnection area"). Thereby, the touch-sensing line 174 is electrically insulated from the touch block electrode 172 with the black matrix 166 interposed in between.

Figure 3A:
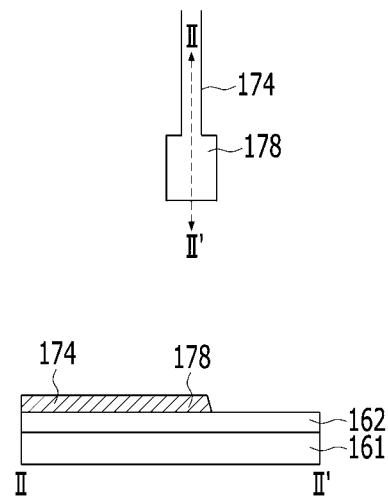
FIGS. 3A and 3B are plan views and cross-sectional views illustrating embodiments of a touch pad illustrated in FIG. 1.
Figure 3B:
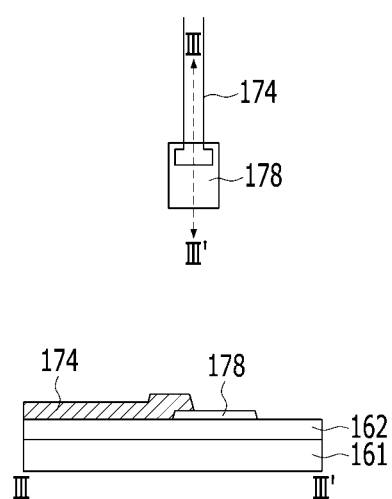
Figure 4:
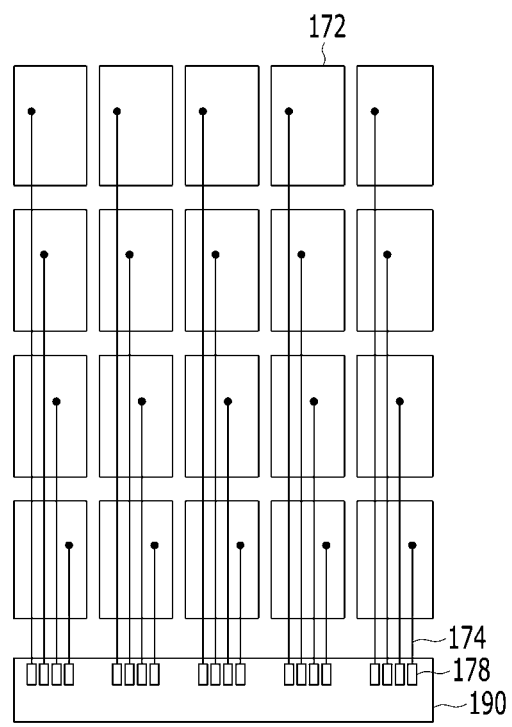
FIG. 4 is a plan view illustrating a touch driver connected to the touch pad illustrated in FIG. 1, according to an embodiment.

In addition, one end of the touch-sensing line 174 is connected to the touch block electrode 172 with the black matrix 166 interposed in between in the area in which the touch-sensing line 174 is connected to the touch block electrode 172. The touch-sensing line 174 may have a line width that is equal to or less than that of the black matrix 166 in the area in which the touch-sensing line 174 is connected to the touch block electrode 172. In this case, one end of the touch-sensing line 174 is electrically connected to the touch block electrode 172, which is exposed through the touch contact hole 168 formed in the black matrix 166, in the area in which the touch-sensing line 174 is connected to the touch block electrode 172. In addition, the other end of the touch-sensing line 174, as illustrated in FIGS. 3A and 3B, extends to a touch pad 178 in a straight line form in any one of the first and second directions, and is connected to the touch pad 178. The touch pad 178 illustrated in FIG. 3A extends from the touch-sensing line 174 and is formed of the same material as the touch-sensing line 174. The touch pad 178 illustrated in FIG. 3B is formed of the same material as the touch block electrode 172. In this case, the touch-sensing line 174 is electrically connected to a portion of the upper surface and the side surface of the touch pad 178. The touch-sensing line 174 transmits a user touch signal, sensed by the touch block electrode 172, to a touch driver 190 illustrated in FIG. 4 through the touch pad 178. The touch driver 190 is connected to the touch-sensing line 174 and receives the user touch signal from the touch-sensing line 174. In addition, the touch driver 190 may detect the occurrence of user touch and the touch position by sensing variation in capacitance, which is caused by the user touch.

Accordingly, in embodiments of the present invention, when the user touches a display area, touch capacitance is created between a touch block electrode 172 that the user touches and at least one other touch block electrode 172 that the user does not touch. The user touch position is detected by comparing the touch capacitance resulting from the user touch with a reference capacitance, and an operation is performed depending on the detected touch position.

Figure 5:
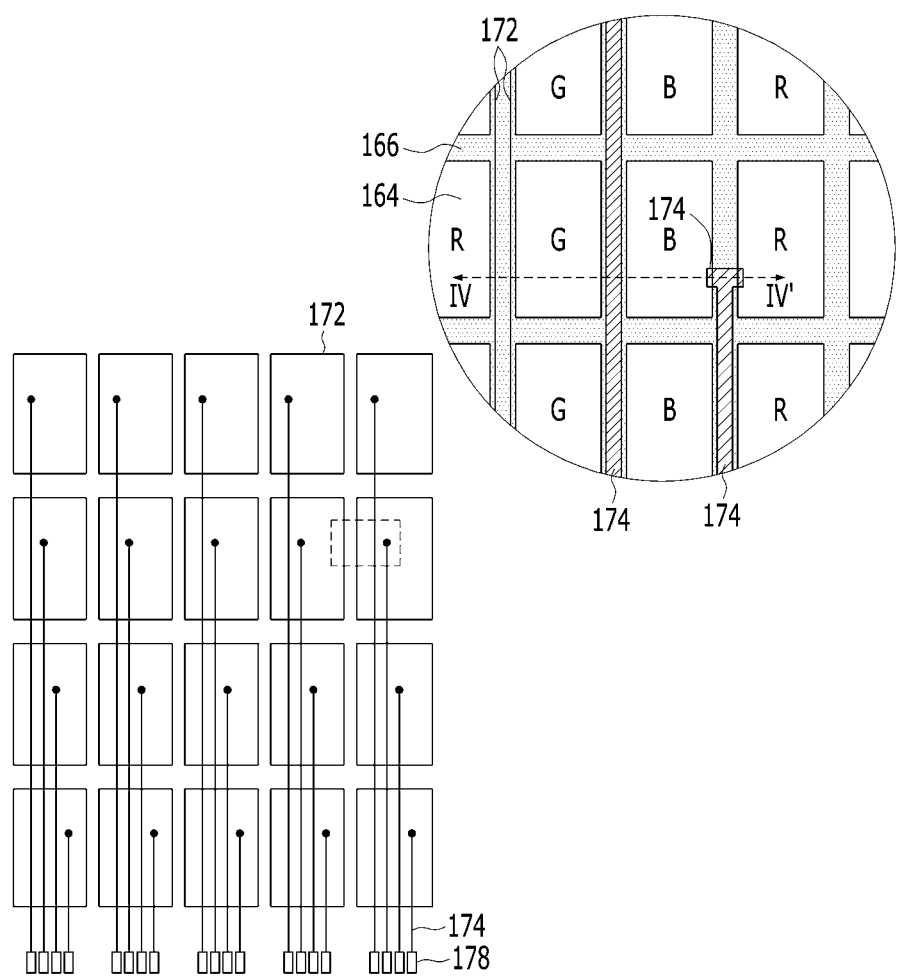
FIG. 5 is a plan view illustrating a color filter array having a touch sensor according to an embodiment.
Figure 6:
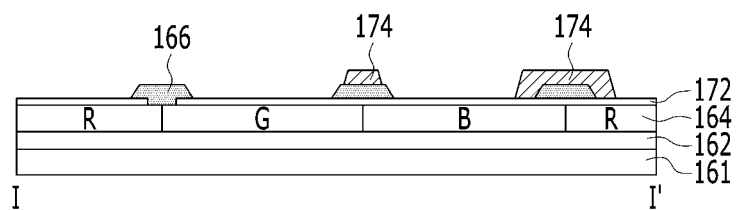
FIG. 6 is a cross-sectional view illustrating the color filter array having the touch sensor taken along line IV-IV' shown in FIG. 5, according to an embodiment.

FIGS. 5 and 6 are, respectively, a plan view and a cross-sectional view illustrating a color filter array having a touch sensor according to an embodiment.

The color filter array illustrated in FIGS. 5 and 6 may include substantially the same constituent elements as the color filter array illustrated in FIGS. 1 and 2, except that the touch-sensing line 174 and the touch block electrode 172 are connected to each other without the touch contact hole 168, for example, the touch-sensing line 174 may be directly connected to the touch block electrode 172, in some embodiments. Thus, a detailed description related to the same constituent elements will be omitted for purposes of clarity.

The touch-sensing line 174 illustrated in FIGS. 5 and 6 has a line width that is equal to or less than that of the black matrix 166 in the area in which the touch-sensing line 174 is not connected to the touch block electrode 172. Thereby, in this "disconnection area", the touch-sensing line 174 is electrically insulated from the touch block electrode 172 with the black matrix 166 interposed in between.

In addition, the touch-sensing line 174 has a line width that is greater than that of the black matrix 166 and another adjacent touch-sensing line 174 in a different area in which the touch-sensing line 174 is connected to the touch block electrode 172. Thereby, the touch-sensing line 174 is formed to surround at least a portion of the side surface and the upper surface of the black matrix 166, thereby being electrically connected to the touch block electrode 172, which is exposed by the black matrix 166.

Figure 7A:
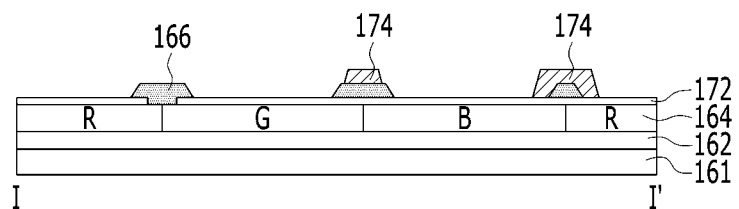
FIGS. 7A and 7B are cross-sectional views illustrating other embodiments of a touch-sensing line illustrated in FIG. 5.

In some embodiments, in the area in which the touch-sensing line 174 is connected to the touch block electrode 172, as illustrated in FIG. 7A, the touch-sensing line 174 (as shown on the right side) has the same line width as the adjacent black matrix 166 (e.g., the adjacent black matrix 166 in the middle or the left side). Further, the black matrix 166 on the right side, which is in the area in which the touch-sensing line 174 and the touch block electrode 172 are connected to each other, has a line width that is less than that of the adjacent black matrix 166. Thereby, the touch-sensing line 174 is formed to surround at least a portion of the side surface and the upper surface of the black matrix 166 so as to be electrically connected to the touch block electrode 172. The touch-sensing line 174 may be formed of an opaque material to prevent light interference and leakage between the sub-pixel areas, in cooperation with the black matrix 166 having a reduced line width.

Figure 7B:
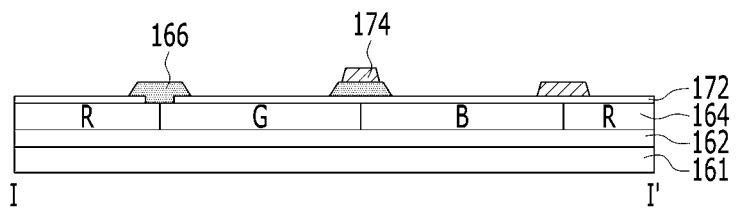

In some embodiments, in the area in which the touch-sensing line 174 is connected to the touch block electrode 172, as illustrated in FIG. 7B, the touch-sensing line 174 is formed on the touch block electrode 172 so as to be directly connected to the touch block electrode 172 without a black matrix 166. The touch-sensing line 174 may be formed of an opaque material to prevent light interference and leakage between the sub-pixel areas without the black matrix 166 in the area in which the touch-sensing line 174 is connected to the touch block electrode 172.

FIGS. 8A to 8D are cross-sectional views for explaining a method of manufacturing the color filter array having the touch sensor of the display device according to an embodiment. In FIGS. 8A to 8D, a method of manufacturing the color filter array illustrated in FIG. 2, which includes the touch pad illustrated in FIG. 3A, will be described by way of example.

Figure 8A:
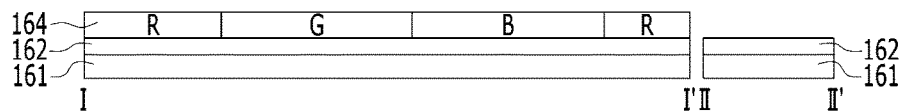
FIGS. 8A to 8D are cross-sectional views for explaining a method of manufacturing the color filter array having the touch sensor illustrated in FIG. 2, according to an embodiment.

Referring to FIG. 8A, the buffer layer 162 and the color filters 164 are sequentially formed on the upper substrate 161.

In some embodiments, the buffer layer 162 is formed by depositing at least one inorganic insulating material selected from among $SiO_2$, $SiN_x$ and $AlO_x$ on the entire surface of the upper substrate 161. A red color resin is applied to the upper substrate 161 having the buffer layer 162 formed thereon, and the red color resin is patterned via a photolithography process using a first mask so as to form the red (R) color filter 164. A green color resin is applied to the upper substrate 161 having the red (R) color filter 164 formed thereon, and the green color resin is patterned via a photolithography process using a second mask so as to form the green (G) color filter 164. A blue color resin is applied to the upper substrate 161 having the green (G) color filter 164 formed thereon, and the blue color resin is patterned via a photolithography process using a third mask so as to form the blue (B) color filter 164. The red, green, and blue color resins may be applied and patterned in any order, e.g., not necessarily in the order described above. In an embodiment, before the buffer layer 162 or the color filter 164 is formed, an alignment key (not illustrated) may be formed via a separate mask process.

Figure 8B:
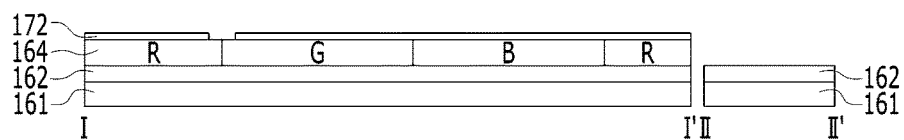

Referring to FIG. 8B, the touch block electrode 172 is formed on the upper substrate 161 having the buffer layer 162 and color filters 164 formed thereon.

In one embodiment, a transparent conductive layer is deposited on the entire surface of the upper substrate 161 having the color filters 164 formed thereon, and the transparent conductive layer is patterned via photolithography and etching processes using a fourth mask so as to form the touch block electrode 172. Here, the transparent conductive layer is formed of a transparent oxide, such as ITO, IZO, IGZO or ITZO, PSS:PEDOT, graphene or AgNW.

Figure 8C:
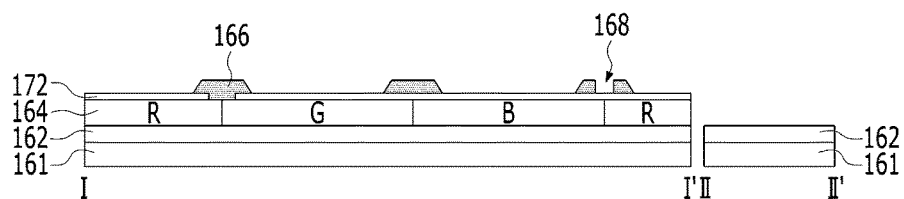

Referring to FIG. 8C, the black matrix 166 having the touch contact hole 168 is formed on the upper substrate 161 having the touch block electrode 172.

In one embodiment, an opaque resin layer is applied to the entire surface of the upper substrate 161 having the touch block electrode 172 formed thereon, and the opaque resin layer is patterned via a photolithography process using a fifth mask so as to form the black matrix 166 having the touch contact hole 168 therein.

Figure 8D:
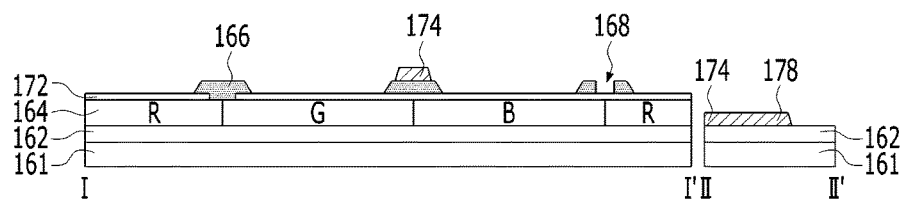

Referring to FIG. 8D, the touch-sensing line 174 is formed on the upper substrate 161 having the black matrix 166 formed thereon.

In one embodiment, an opaque conductive layer is deposited on the entire surface of the upper substrate 161 having the black matrix 166 formed thereon, and the opaque conductive layer is patterned via photolithography and etching processes using a sixth mask so as to form the touch-sensing line 174. Here, the opaque conductive layer has a single layer or multilayer structure using a conductive metal, such as, for example, Al, Cu, Mo, or MoTi.

As described above, because the color filter array according to an embodiment may be formed via a total of six mask processes (or a total of seven mask processes when an alignment mark is included), three mask processes may be obviated as compared to a conventional method for manufacturing touchscreens or display panels including two touch-sensing lines. Thereby, the color filter array according to embodiments of the present invention may achieve a simplified manufacturing process, increased productivity, and reduced costs, compared to the related art.

In some embodiments, the color filter array may be formed after a support substrate is coupled (e.g., attached) to the bottom surface of the upper substrate 161. Specifically, in order to be applied to a bending-type or folding-type display device, the support substrate may be attached to the bottom surface of the upper substrate 161. The support substrate is a thin plastic substrate, so that six mask processes are performed in total for example, that is, the thin plastic substrate does not require an additional mask process. After the mask processes are completed (or at any other given time), the support substrate may be removed using, for example, a laser.

Figure 9:
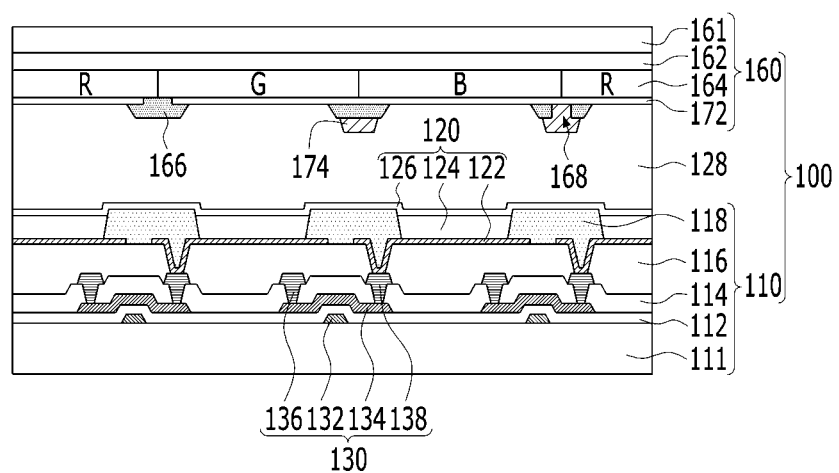
FIG. 9 is a cross-sectional view illustrating an organic field emission display panel, which includes the color filter array having the touch sensor according to an embodiment.

As described above, the color filter array having the touch sensor, which is completed by the manufacturing method shown in FIGS. 8A to 8D, may be applied to an organic light-emitting display panel 100 as illustrated in FIG. 9 or a liquid crystal display panel having color filters.

The organic light-emitting display panel 100 illustrated in FIG. 9 includes a color filter array 160 and a thin-film transistor array 110, which are bonded to each other with an adhesive layer 128 interposed in between.

The color filter array 160 has the same structure as the color filter array described above, and thus a detailed description thereof will be omitted for purposes of clarity.

The thin-film transistor array 110 includes at least one switching thin-film transistor (not illustrated), at least one driving thin-film transistor 130, and a light-emitting element 120, which are formed on a lower substrate 111 formed of plastic or glass.

The switching thin-film transistor is connected to a gate line (not illustrated) and a data line (not illustrated) at the intersection thereof, and the driving thin-film transistor 130 is connected to the switching thin-film transistor and a power line (not illustrated). Here, any one of the gate line, the data line, and the power line may overlap with the touch-sensing line 174. For example, the touch-sensing line 174 overlaps the shortest signal line (e.g. the data line), among the gate line, the data line, and the power line, in consideration of line resistance.

The driving thin-film transistor 130 includes a gate electrode 132, a semiconductor layer 134, which overlaps the gate electrode 132 with a gate insulating layer 112 interposed in between, and source and drain electrodes 136 and 138, which are formed on a first protective layer 114 and contact the semiconductor layer 134.

The light-emitting element 120 includes an anode 122, an organic light-emitting layer 124 formed on the anode 122, and a cathode 126 formed on the organic light-emitting layer 124.

The anode 122 is electrically connected to the drain electrode 138 of the driving thin-film transistor 130, which is exposed through a contact hole formed in a second protective layer 116. The organic light-emitting layer 124 is formed on the anode 122 in an emission area, which is defined by one or more banks 118. Here, the banks 118 are formed so as to overlap one of the black matrixes 166. In one embodiment, the organic light-emitting layer 124 is formed on the anode 122 by stacking a hole-related layer such as a hole rejection layer or a hole transporting layer, a light-emitting layer, and an electron-related layer such as an electron injection layer or an electron transporting layer one above another in this sequence or in the reverse sequence (or in another suitable sequence). The cathode 126 is formed so as to overlap the anode 122 with the organic light-emitting layer 124 interposed in between.

In the organic field emission display device according to an embodiment, after the color filter array 160 having the touch sensor and the thin-film transistor array 110 having the light-emitting element 120 are separately manufactured, the color filter array 160 and the thin-film transistor array 110 are bonded to each other via the adhesive layer 128. Thereby, in a conventional process where the light-emitting layer and the color filters are formed on the same substrate, the light-emitting layer may be damaged because it cannot endure the curing temperature of the color filters. On the other hand, in a manufacturing process according to an embodiment of the present invention, because the color filters and the light-emitting layer are formed on different substrates, it is possible to prevent damage to the light-emitting layer when the color filters are cured.

Although the upper and lower substrates have been described as being formed of plastic or glass by way of example, embodiments of the present invention may be applied to an encapsulated substrate structure.

As is apparent from the above description, according to embodiments of the present invention, a touch-sensing line is provided in any one of first and second directions. Thereby, because the touch-sensing line is formed in any one of the first and second directions, compared to touch-sensing lines of conventional touchscreens or display devices that are formed in first and second directions, the generation of cracks in the touch-sensing line is reduced or minimized when it is applied to a bending-type or folding-type display device, which increases product design freedom and reliability. In addition, embodiments of the present invention, in which the touch-sensing line is formed only in one direction, may achieve a simplified structure, a reduced number of mask processes, increased productivity, and reduced costs as compared to the related art, in which two touch-sensing lines are formed in two directions.

It will be apparent to those skilled in the art that embodiments of the present invention described above is not limited to the embodiments described above and the accompanying drawings, and various substitutions, modifications, and alterations may be devised within the spirit and scope of embodiments of the present invention.

What is claimed is:

1. A color filter array having a touch sensor, the color filter array comprising:
   a plurality of color filters arranged in first and second directions on a substrate;
   a touch block electrode disposed on the plurality of color filters to sense a user touch position;
   a black matrix disposed on the touch block electrode between at least two of the plurality of color filters; and
   a plurality of touch-sensing lines each extended in the first direction or the second direction to cut across the touch block electrode overlapping with the plurality of color filters, a touch-sensing line of the plurality of touch-sensing lines being connected to the touch block electrode.

2. The color filter array according to claim 1, wherein the touch-sensing line is connected to the touch block electrode with the black matrix interposed in between in a connection area of the touch-sensing line and the touch block electrode.

3. The color filter array according to claim 2, wherein, in the connection area of the touch-sensing line and the touch block electrode, the touch-sensing line has a line width that is equal to or less than that of the black matrix, the touch block electrode being exposed through a touch contact hole formed in the black matrix.

4. The color filter array according to claim 2, wherein, in the connection area of the touch-sensing line and the touch block electrode, the touch-sensing line has a line width that is greater than that of the black matrix, the touch block electrode being exposed by the black matrix.

5. The color filter array according to claim 2, wherein, in the connection area of the touch-sensing line and the touch block electrode, the touch-sensing line is disposed on the touch block electrode so as to be directly connected to the touch block electrode.

6. The color filter array according to claim 5, wherein the touch-sensing line is formed of an opaque material.

7. The color filter array according to claim 5, wherein the touch-sensing line has a line width that is equal to or less than that of the black matrix in a disconnection area of the touch-sensing line and the touch block electrode.

8. The color filter array according to claim 1, further comprising a plurality of touch pads arranged in the first direction, a touch pad of the plurality of touch pads being connected to the touch-sensing line,
wherein the touch pad is formed of a same material as the touch-sensing line and extends from the touch-sensing line.

9. The color filter array according to claim 8, wherein the touch-sensing line extends in a straight line from the touch pad in the second direction.

10. The color filter array according to claim 1, further comprising a plurality of touch pads arranged in the first direction, a touch pad of the plurality of touch pads being connected to the touch-sensing line,
wherein the touch pad is formed of a same material as the touch block electrode, and
wherein the touch-sensing line is connected to a portion of an upper surface and a side surface of the touch pad.

11. The color filter array according to claim 10, wherein the touch-sensing line extends in a straight line from the touch pad in the second direction.

12. The color filter array according to claim 1, wherein in a disconnection area of the touch-sensing line and the touch block electrode, the touch-sensing line is electrically insulated from the touch block electrode with the black matrix interposed in between.

13. A display panel comprising:
a thin-film transistor array; and
a color filter array bonded to the thin-film transistor array, the color filter array having a touch sensor,
wherein the color filter array further includes:
a plurality of color filters arranged in first and second directions on a substrate;
a touch block electrode disposed on the plurality of color filters to sense a user touch position;
a black matrix disposed on the touch block electrode between at least two of the plurality of color filters; and
a plurality of touch-sensing lines each extended in the first direction or the second direction to cut across the touch block electrode overlapping with the plurality of color filters, a touch-sensing line of the plurality of touch-sensing lines being connected to the touch block electrode.

14. The display panel according to claim 13, wherein the thin-film transistor array includes:
a thin-film transistor;
a light-emitting element connected to the thin-film transistor; and
a signal line configured to overlap the touch sensing line.

15. The display panel according to claim 13, wherein the touch-sensing line is connected to the touch block electrode with the black matrix interposed in between in a connection area of the touch-sensing line and the touch block electrode.

16. The display panel according to claim 15, wherein, in the connection area of the touch-sensing line and the touch block electrode, the touch-sensing line has a line width that is equal to or less than that of the black matrix, the touch block electrode being exposed through a touch contact hole formed in the black matrix.

17. The display panel according to claim 15, wherein, in the connection area of the touch-sensing line and the touch block electrode, the touch-sensing line has a line width that is greater than that of the black matrix, the touch block electrode being exposed by the black matrix.

18. The display panel according to claim 15, wherein, in the connection area of the touch-sensing line and the touch block electrode, the touch-sensing line is disposed on the touch block electrode so as to be directly connected to the touch block electrode.

19. The display panel according to claim 18, wherein the touch-sensing line is formed of an opaque material.

20. The display panel according to claim 18, wherein the touch-sensing line has a line width that is equal to or less than that of the black matrix in a disconnection area of the touch-sensing line and the touch block electrode.

21. The display panel according to claim 13, further comprising a plurality of touch pads arranged in the first direction, a touch pad of the plurality of touch pads being connected to the touch-sensing line.

22. The display panel according to claim 21, wherein the touch pad is formed of a same material as the touch-sensing line and extends from the touch-sensing line.

23. The display panel according to claim 21, wherein the touch pad is formed of a same material as the touch block electrode, and
wherein the touch-sensing line is connected to a portion of an upper surface and a side surface of the touch pad.

24. The display panel according to claim 23, wherein the touch-sensing line extends in a straight line from the touch pad in the second direction.

25. The display panel according to claim 13, wherein in a disconnection area of the touch-sensing line and the touch block electrode, the touch-sensing line is electrically insulated from the touch block electrode with the black matrix interposed in between.

* * * * *